United States Patent [19]

Viall, Sr. et al.

[11] 3,923,330
[45] Dec. 2, 1975

[54] ARTICULATED BUMPER

[76] Inventors: Charles S. Viall, Sr., 1150D S. State College Blvd., Anaheim, Calif. 92806; Charles S. Viall, Jr., 3401 Gaviota, Long Beach, Calif. 90008

[22] Filed: July 22, 1974

[21] Appl. No.: 490,484

[52] U.S. Cl. .......... 293/4; 180/9 Z; 200/61.44; 293/5; 293/64; 293/73; 293/87; 293/90; 293/99; 296/55; 298/1 R; 298/17 R; 298/23 R; 340/61
[51] Int. Cl.² .......... B60R 19/06; B60R 27/00; B60T 7/12; B61F 19/06
[58] Field of Search ....... 180/9.1, 92, 94; 200/61.44; 280/150 B; 293/1, 4, 5, 58, 64, 73, 85, 87, 90, 99, 6; 296/28 M, 50, 53, 55; 298/1 R, 1 SG, 17 R, 23 R; 340/61

[56] References Cited
UNITED STATES PATENTS

| | | | |
|---|---|---|---|
| 1,579,928 | 4/1926 | Groesbeck | 340/61 |
| 1,625,505 | 4/1927 | Stump et al. | 200/61.44 |
| 2,444,635 | 7/1948 | Dennis, Jr. | 340/61 |
| 2,567,443 | 9/1951 | O'Meara | 340/61 |
| 2,990,212 | 6/1961 | Nicastro | 293/73 X |
| 3,012,225 | 12/1961 | Holt et al. | 340/61 |
| 3,210,110 | 10/1965 | Chieger | 293/87 X |
| 3,370,878 | 2/1968 | Carr | 293/73 X |
| 3,409,874 | 11/1968 | Bowler et al. | 340/61 |
| 3,510,837 | 5/1970 | Lepore et al. | 340/61 |
| 3,709,542 | 1/1973 | Fehlau et al. | 293/73 |

*Primary Examiner*—M. Henson Wood, Jr.
*Assistant Examiner*—Howard Beltran
*Attorney, Agent, or Firm*—Gausewitz, Carr & Rothenberg

[57] ABSTRACT

A safety bumper for vehicles comprises impact elements attached to the front or rear portion of a vehicle; electrical switches and circuitry automatically cause the brakes to be applied and/or an alarm to be given when the vehicle is in a reverse gear, and an obstruction encountered by the impact elements causes forward pivoting of the support members; to prevent damage to the impact elements and the obstruction, resilient elements of the support members and the impact elements themselves flex to allow continued forward deflection of the impact elements as the vehicle is brought to a stop; upper ends of the support members move with a tilting vehicle bed to swing the impact elements away from the ground; the support members are hinged intermediate their ends permitting lower portions thereof, and the impact elements attached thereto, always to hang vertically, thereby also providing clearance between the bumper components and the vehicle wheels when the bed is tilted. A variation having similar, but sectioned, impact elements is supported from the lower corners of horizontally swinging doors at the rear of a vehicle.

20 Claims, 8 Drawing Figures

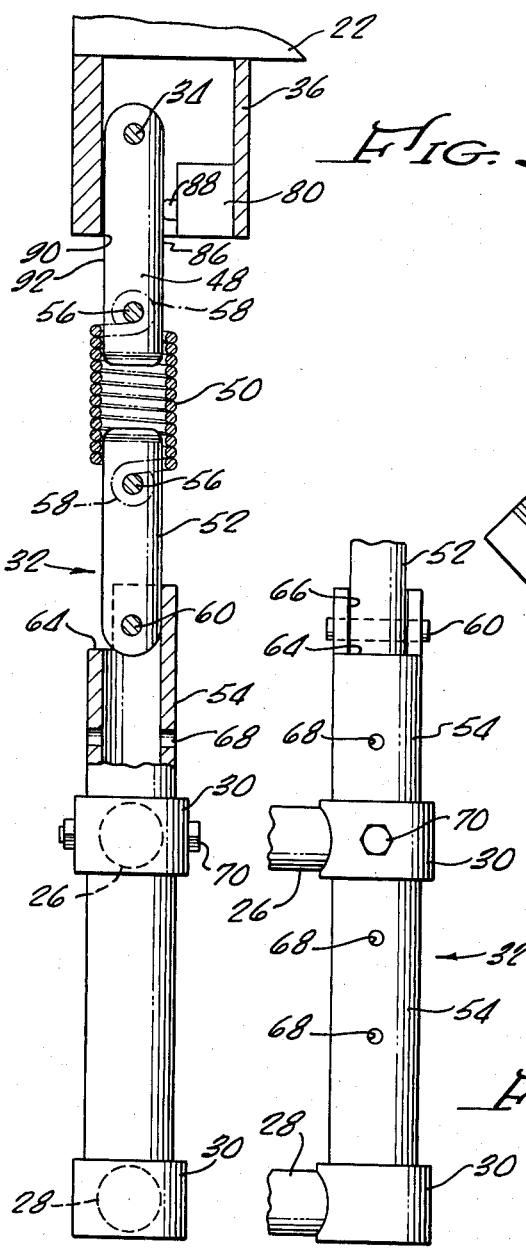
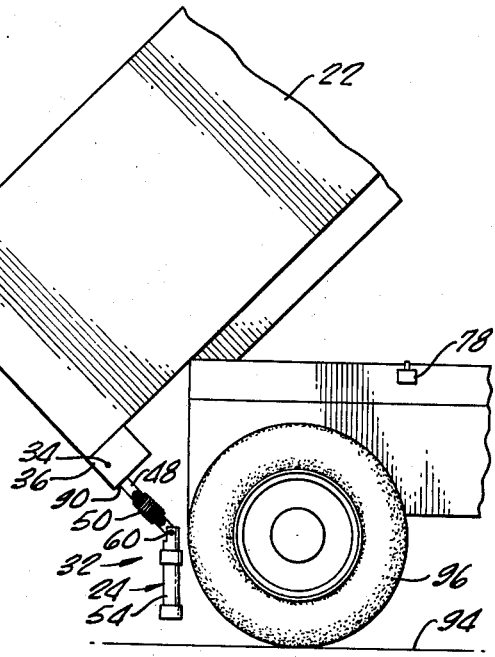
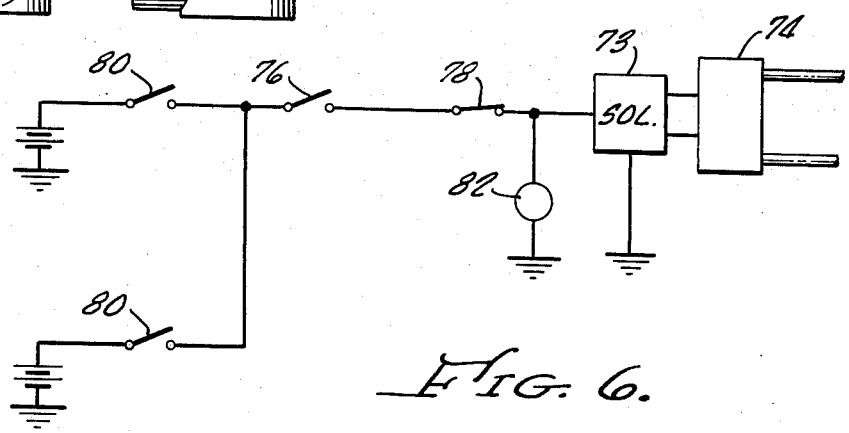

ARTICULATED BUMPER

BACKGROUND OF THE INVENTION

1. Field of the Invention:

The invention relates generally to the field of bumper actuated warning systems. More particularly, it relates to bumper actuated brake and alarm systems.

2. Description of Prior Art:

Various vehicle bumper systems have been disclosed which activate warning lights, horns or the vehicle's brakes. These systems normally comprise a bumper which either replaces or extends beyond a normal bumper and which, when an obstruction is encountered, deflects to actuate an electrical switch connected to a light, a horn or a brake control. Such bumper systems are usually installed only at the rear of a vehicle to provide added safety in backing. Most are normally retracted, being deployed to an extended position when the vehicle is in reverse.

Many are not adaptable to vehicles which may be required to back against loading structures.

Bumper systems installed at the rear of vehicles generally include a low bumper element for contacting relatively small objects on the ground. Such bumper systems are not suitable for use on most vehicles with tilting beds because when the vehicle bed would be tilted, the bumper element would be swung either downwardly into contact with the ground or forwardly into the vehicle structure.

Heretofore, there have been no bumper systems adapted for installation at the rear of a tilting bed vehicle which may be constructed so as to not extend beyond the outline of the vehicle, which will not cause parts of the bumper to contact parts of the vehicle or the ground when the vehicle bed is tilted, and will cause actuation of the brakes or give an alarm when an obstacle is encountered by the backing vehicle. The present invention overcomes these deficiencies of the prior art.

SUMMARY OF THE INVENTION:

In carrying out principles of the present invention, a bumper unit is attached to at least one support member which is pivotally connected to the vehicle. Means are provided for generating a signal to apply the brakes of the vehicle and/or give an alarm when an obstruction, encountered by the bumper unit, causes forward deflection thereof and pivoting of the support member. The support member incorporates a resilient element to allow continued deflection of the bumper, after the brakes have been applied and while the vehicle is stopping, to prevent damage to the encountered obstruction and the bumper unit.

More specifically, the bumper unit, comprising replaceable, resilient, impact elements, is attached to lower regions of spaced elongated support members, upper regions of which are connected for slight forward pivotal movement to brackets attached to rear of the bed of a vehicle. A helical spring resilient element, having a longitudinal axis coincident with that of the support member, forms a portion of each support member.

When a vehicle is in a reverse gear, a brake actuation system is energized by the closing of electrical switches. If, as the vehicle backs up, the bumper or the support members contact an obstruction, for example an automobile, the support members are caused to pivot forwardly. This closes contacts of electrical switches located adjacent to upper regions of the support members, causing the vehicle's brakes to be applied. The resilient elements of the support members and the resiliency of the impact elements allow continued forward deflection of the bumper unit as the vehicle is stopped, thereby preventing damage to whatever obstruction has been encountered or to the bumper unit.

On a tilt bed vehicle, as the bed is tilted, the bumper unit is swung inwardly toward the vehicle, contact with the ground being thereby avoided. However, the support members are hinged intermediate their ends so that lower regions thereof, and the bumper unit attached thereto, pivot relative to upper regions thereof to remain vertical, thereby providing clearance between the bumper unit and the vehicle, particularly the wheels. This hinging allows only relative rearward pivoting of the lower ends of the support members when the bed is in a lowered configuration, thus permitting the entire support members to pivot forwardly to close the brake actuation switches.

In a variation, a split bumper unit, similar to the type described, is attached to support members depending from lower regions of outwardly opening doors at the rear of a vehicle. Installation and operation is otherwise substantially the same as that of the first embodiment.

The bumper system not only is effective as set forth above, but also is comparatively easy and inexpensive to produce and install.

BRIEF DESCRIPTION OF THE DRAWINGS:

FIG. 3 is a side view showing elements of a bumper support member;

FIG. 4 is a fragmentary rear elevational view of the bumper mount attachment region of the support member;

FIG. 5 is a side elevational view showing hinging of the bumper support members when the truck bed is tilted;

FIG. 6 is an electrical schematic drawing of the brake actuation system;

Figure 1:
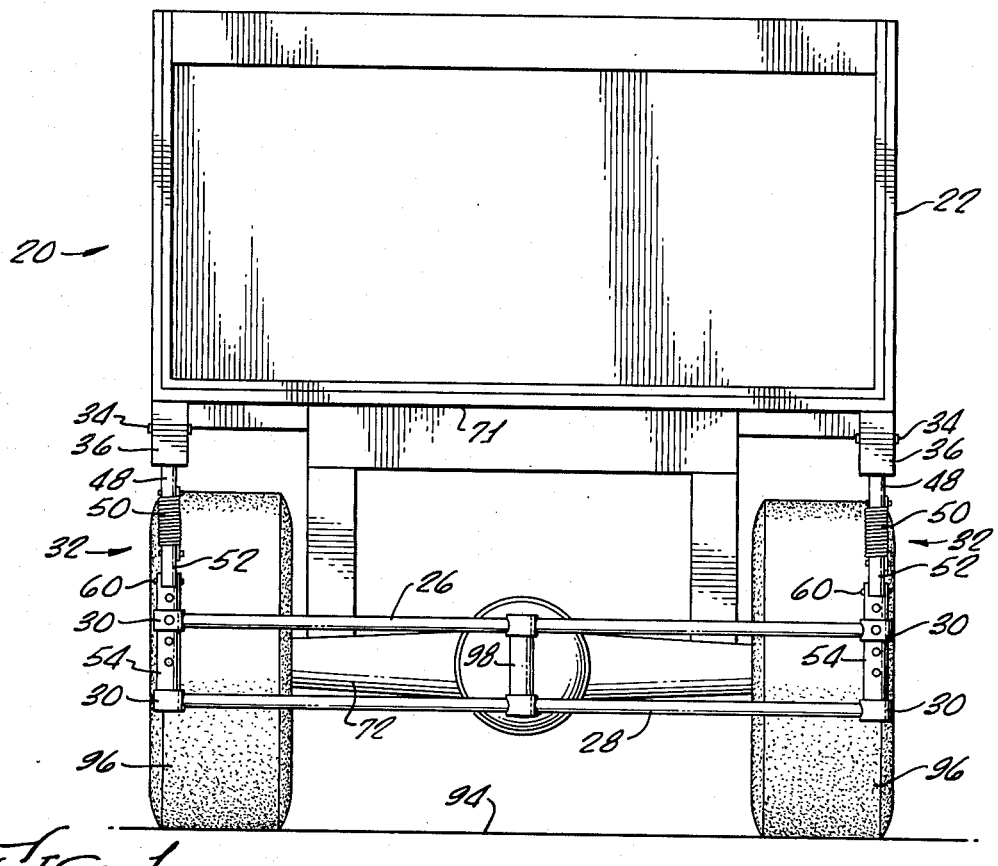
FIG. 1 is a rear elevational view showing the bumper system applied to a tilt bed truck with the truck bed in its lowered, normal position.
Figure 2:
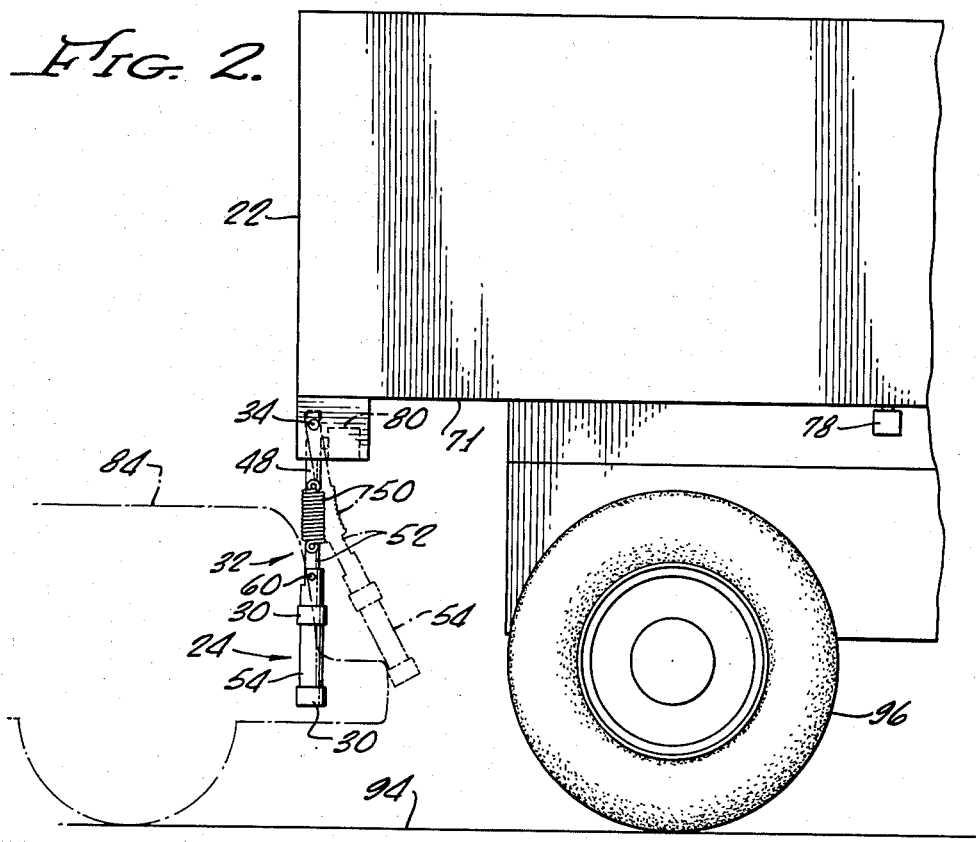
FIG. 2 is a partial side elevational view showing the bumper system with the truck bed in its lowered, normal position.

DESCRIPTION OF THE PREFERRED EMBODIMENT:

A truck 20, having a tilting bed 22 to which is attached a brake-actuating safety bumper, is illustrated in FIGS. 1, 2 and 5. A bumper unit 24, preferably comprising a resilient upper impact element 26 and a resilient lower impact element 28, has ends attached at fittings 30 to lower regions of a pair of depending support members 32. The support members 32 are pivotally connected by pivot pins 34 to brackets 36 which are attached (as by welding) to the lower rear corners of the truck bed 22.

As best seen in FIGS. 3 and 4, each support member 32 comprises a rigid upper link or bar 48, a resilient helical spring 50, a rigid lower link 52, and a rigid tubular bumper mount 54. The upper end of the upper link 48 is the portion of the support member 32 that is attached by the pivot pin 34 to the bracket 36. Adjacent ends of the upper link 48 and the lower link 52 extend into the open ends of the helical spring 50, being spaced apart therein. The links 48 and 52 are attached to the helical spring 50 by bolts 56 which pass through holes in the links and through end loops 58 of the spring.

The lower end of the lower link 52 extends a short distance into the upper end of the tubular mount 54, where it is pivotally connected thereto by a transverse pin 60. The upper rearward corner of the tubular mount 54 is cut away, providing a transverse edge 64 below the pin 60. This results in a slot 66 at the upper rearward portion of the mount 54 which permits the mount to pivot rearwardly relative to the lower link 52. With the lower end of the lower link 52 being received in the open upper end of the mount 54, these end portions cooperate to prevent forward pivoting of the mount 54 relative to the lower link 52 when the support member 32 is vertical.

Several vertically spaced holes 68 are provided through upper regions of the bumper mount 54 at right angles to the pins 60. The fittings 30 to which the upper impact element 26 is secured may be positioned at any of the holes 68, being attached to the bumper mount 54 by bolts 70 therethrough. In this manner, the spacing between the upper impact element 26 and the bottom 71 of the tilting bed 22, and consequently the spacing between the impact elements, may be varied for optimum effectiveness of the bumper as installed on any height truck. Typically, the bumper unit 24 is positioned at about the height of the truck axle 72.

A signal generating electrical system adapted for actuating pneumatic truck brakes is shown schematically in FIG. 6. An air brake solenoid 73 is attached to an air valve 74 which controls flow of pressurized air from an existing source (not shown) to existing brake cylinders (also not shown) at the truck wheels. A normally open reverse switch 76 and a normally closed truck bed tilt switch 78 are connected in series with two normally open bumper switches 80 which are in parallel with each other. The switch 78 is opened to deactivate the electrical system when the bed 22 is tilted. The bumper switches 80, as seen in FIG. 2, are mounted within the brackets 36 closely adjacent to and forward of the upper links 48 of the support members 32.

A warning element 82, such as a light or horn, may be wired in parallel with the solenoid 73 in order to alert the operator of the vehicle when an obstruction is encountered by the bumper unit 24. In some instances, it may be preferred to use the warning element 82 alone, but ordinarily automatic brake operation is included for maximum safety through the use of this invention.

The electrical system of this invention is equally adapted to the actuation of hydraulic brakes, through the use of a solenoid or mechanically operated hydraulic cylinder. This system also is adaptable to the actuation of electrical brakes.

OPERATION OF THE PREFERRED EMBODIMENT:

Let it be assumed that the truck 20 upon which the safety bumper has been installed is backing with the tilting bed 22 lowered. The switches 76 and 78 will be closed, the switch 76 by the truck 20 being in a reverse gear and the switch 78 by the tilting bed being in a lowered position. The electrical brake actuating system is thereby in readiness to cause the truck brakes to be applied if the bumper unit 24 should encounter an obstruction.

If the bumper unit 24 encounters an obstruction 84, such as an automobile, continued rearward movement of the truck causes the support members 32, to which the bumper unit 24 is attached, to pivot forwardly about the pivot pins 34, the spring elements 50 being sufficiently stiff that the entire support member is pivoted forwardly by the bumper unit. This forward pivotal motion of the support members 32 causes forward edges 86 of the upper links 48 to depress plungers 88 of the switches 80, thereby closing contacts thereof. This actuates the solenoid 73, thereby directing compressed air through the air valve 74 to the truck's brakes to stop the truck. If the warning element 82 is wired in parallel with the solenoid 73, a warning will be given as well.

Stopping of the vehicle is very rapid but not instantaneous and rearward movement of the truck will continue for a few inches after the brakes have been applied. Continued forward pivoting of the upper links 48 of the support member 32 is prevented by the switches 80. The helical springs 50 now flex to allow limited continued forward movement of the bumper unit 24 (as shown in phantom lines in FIG. 2) to prevent damage to whatever obstruction the bumper has encountered, and to the bumper as well. Flexing of the resilient impact elements 26 and 28 also helps prevent such damage. The resiliency of the helical springs 50 forces the upper and lower links 48 and 52 of the support members 32 to become realigned when the bumper unit 24 is moved out of contact with the obstruction.

Assume now that the bumper unit 24 is clear of any obstruction and the bed 22 of the truck is tilted (FIG. 5). The upper links 48 of the support members 32 are prevented from rearward rotation relative to the brackets 36 by rearward corners 90 of the brackets 36 contacting rearward edges 92 of the upper links. Always remaining substantially perpendicular to the bottom 71 of the truck bed 22, the upper links 48 swing the bumper unit 24 away from the surface 94 beneath the truck, as the truck bed tilts, thereby preventing damage to the bumper unit.

As the upper links 48 are swung out of their initial vertical position, the bumper mounts 54 pivot about the pins 60 and remain vertical. This pivoting prevents the bumper unit 24 from being swung into contact with rear truck wheels 96 or other truck structure. The resilience of the spring elements 50 maintains alignment of the upper and lower links 48 and 52 of the support members 32 when the truck bed is tilted and the support members are not vertical.

The switch 78 is open deactivating the brake actuating system when the bed 22 of the truck 20 is tilted, as inadvertent operation of the brakes is undesirable when the backing truck is in a dumping configuration. Optionally the switch 78, or an additional switch, may be positioned for manual operation to allow selective overriding of the safety system.

The bumper elements 24 and 26 are elongate tubes preferably constructed of a resilient plastic such as polyvinyl chloride so they may flex to help avoid damaging any obstruction encountered thereby. They are preferably constructed of thin wall tubing so as to break before causing significant damage to the obstruction in the event the truck is not stopped quickly enough. In the event of breakage, the bumper elements are easily replaceable at the fittings 30. The bumper elements 24 and 26 are interconnected at their centers by a link 98 (FIG. 1) which prevents spreading thereof when an obstruction is encountered and thus helps assure proper automatic actuation of the brakes. The bumper elements may be covered with a layer of a soft spongy material to further help prevent any damage to objects into which the truck backs.

Figure 7:
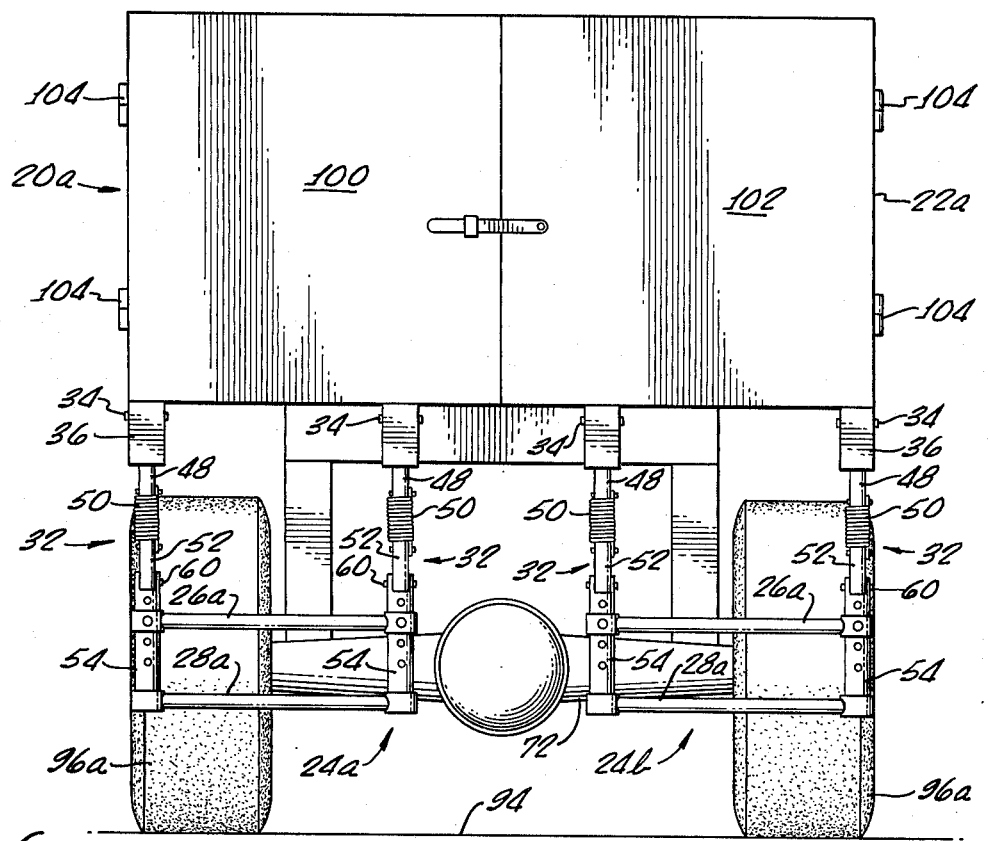
FIG. 7 is a rear elevational view showing a variation of the bumper system attached to swinging doors of a tilting bed truck.
Figure 8:
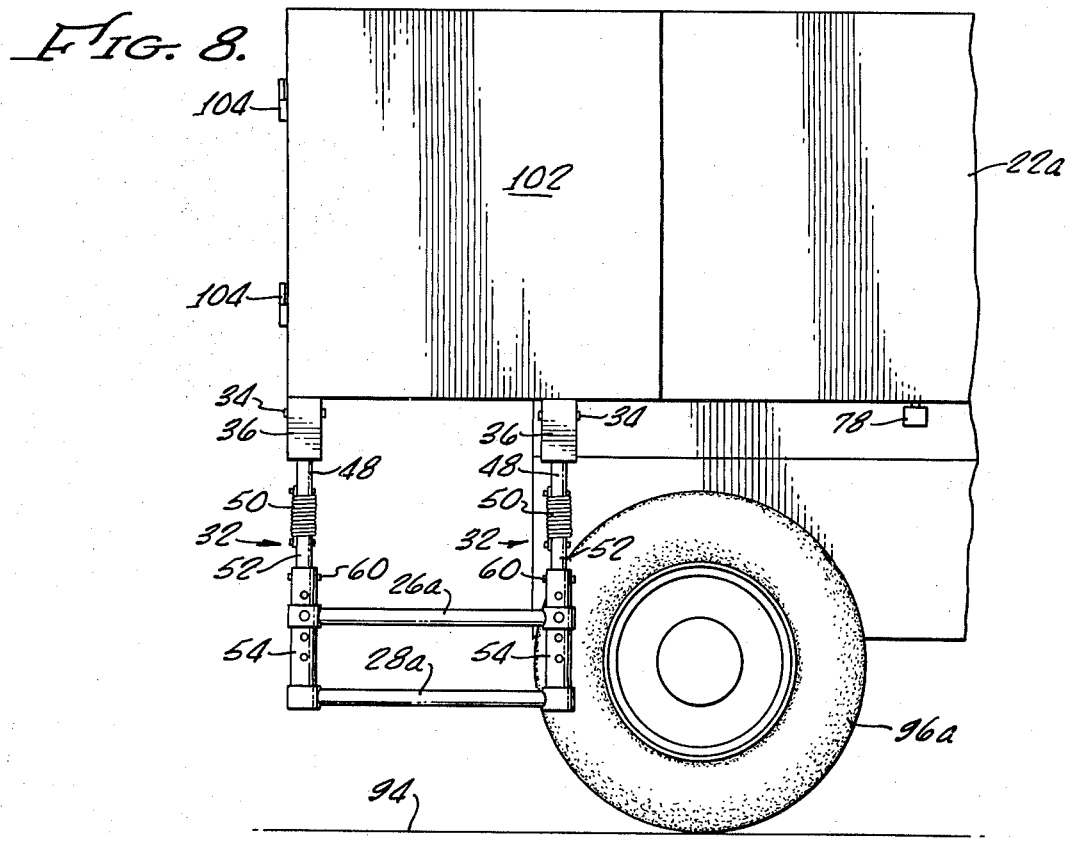
FIG. 8 is a side elevational view showing the variation of FIG. 5 with doors opened through 270°.

DESCRIPTION OF A VARIATION OF THE PREFERRED EMBODIMENT:

FIGS. 7 and 8 illustrate a variation of the preferred embodiment wherein the brackets 36 are attached to bottom corners of a pair of outwardly opening doors 100 and 102 at the back of a tilting bed 22a of a truck 20a. In order that the doors may open, the bumper is split into two transverse segments 24a and 24b, each of which comprises upper and lower resilient elements 26a and 28a (similar to the bumper elements 26 and 28). The segment 24a is attached to two support members 32 depending from the door 100 and the segment 24b is attached to two support members 32 depending from the door 102.

The four support members 32 are pivotally connected to brackets 36 by pivot pins 34. Normally open switches 80 are attached to at least the two outermost of the brackets 36 closely adjacent to and forward of the upper links 48 of the support members 32. The truck's brakes are applied in the manner described above if either of the bumper segments 24a or 24b encounter an obstruction when the truck 20a is backing and the truck bed 22a is lowered.

When the doors 100 and 102 are swung fully open, on hinges 104, the doors and the bumper segments 24a and 24b are caused to be substantially parallel to, and along the sides of, the truck bed 22a. As the bumper segments and the support members 32 are then outboard of the rear truck wheels 96a, the truck bed 22a may be tilted without any portion of the safety bumper being swung into contact with the truck. Consequently, it is unnecessary in this configuration that lower portions of the support members 32 pivot rearwardly.

It may, however, be necessary or desirable to tilt the truck bed 22a with the doors 100 and 102 closed or only slightly open, in which case the bumper segments 24a and 24b are laterally positioned at the rear of the truck. As was described above, clearance between the bumper segments 24a and 24b and the wheels 96a, when the bed 22a is then tilted, is provided by hinging the bumper mounts 54 at pins 60 to the lower links 52 of the support members 32.

The safety bumpers described in the preferred embodiment and the variation thereof are easily and inexpensively produced, and easily installed and maintained. Contact between the bumper unit and both the surface on which the truck is riding and the truck structure is prevented, when the truck bed tilts, by the pivoting of upper portions of the support members 32 with the tilting bed and by the pivoting of the bumper mounts 54 relative to the lower links 52 of the support members.

Although the bumper unit 24 and bumper segments 24a and 24b have been shown and described as each being attached to pairs of support members 32, the scope of the invention includes use of only a single support member or use of more than two support members. And, although the preferred embodiment and the variation thereto are shown and described as attached to the rear of a tilting bed truck, the scope of the invention encompasses use of such a bumper system on either the front or rear of any type of vehicle.

It is thus to be understood that the foregoing description is for illustrative purposes only and no limitations are thereby intended, the scope of the invention being limited solely by the claims.

What is claimed is:

1. In combination with a vehicle having brakes and a tilting bed movable to lower the rearward portion thereof and to raise the forward portion thereof, a safety bumper, comprising:
    a. obstacle encountering means for contacting obstructions,
    b. at least one support member,
        said support member having a resilient flexible portion intermediate first and second regions thereof,
        said resilient flexible portion including a spring one end of which is connected to said first region and the other end of which is connected to said second region for allowing relative deflection of said first and second regions,
        said obstacle encountering means being attached to said first region,
    c. connecting means for pivotally connecting said second region of said support member to said tilting bed of said vehicle so that said support member depends therefrom,
        said connecting means permitting limited substantially unrestricted pivoting of said second region in one direction relative to said vehicle while precluding further pivoting thereof, and
    d. signal generating means for generating a signal when movement of said obstacle encountering means causes a predetermined pivotal movement of said support member in said one direction,
        said resilient flexible portion of said support member remaining substantially undeflected until said predetermined pivotal movement of said support member causes said signal to be generated.

2. The safety bumper of claim 1 wherein said resilient flexible portion of said support member flexes after said predetermined pivotal movement of said support member causes said signal to be generated, thereby permitting further movement of said obstacle encountering means.

3. The safety bumper of claim 1 wherein said support member includes hinge means intermediate the ends of one of said regions thereof for permitting pivoting of one section of said one region in one direction relative to another section of said one region, and for substantially preventing pivoting of said one section in the opposite direction relative to said other section beyond a predetermined point.

4. The safety bumper of claim 1 wherein said signal generating means includes brake activating means for causing activation of said brakes of said vehicle upon generation of a signal by said signal generating means.

5. The safety bumper of claim 1 wherein said obstacle encountering means includes resilient impact elements.

6. In combination with a vehicle having a tilting bed movable to lower the rearward portion thereof and raise the forward portion thereof, a safety bumper, comprising:
- a. an impact element,
- b. support means for supporting said impact element, said support means including
    a depending member having
        an upper section,
        and a lower section connected to said impact element,
    pivotal connecting means for connecting said upper section to said tilting bed of said vehicle,
        said pivotal connecting means including means for allowing only limited substantially unrestricted pivotal movement of said upper section relative to said vehicle while substantially precluding further pivotal movement,
    a spring intermediate said upper section and said lower section for normally maintaining said upper section and said lower section in a predetermined alignment,
        said spring being deflectable upon such limited substantially unrestricted pivotal movement of said upper section relative to said vehicle in one direction for allowing further movement of said lower section and said impact element,
    and hinge means intermediate the ends of one of said sections for allowing rotation of a lower part of said one section rearwardly relative to an upper part of said one section upon such movement of said bed so as to maintain said lower part relatively more vertical than said upper part, while substantially precluding such rotation in the opposite direction, and
- c. signal generating means for generating a signal upon pivotal movement of said upper section relative to said vehicle in said one direction.

7. The safety bumper of claim 6 in which, said upper section is connected to one end portion of said spring and said lower section is connected to the opposite end portion of said spring.

8. In combination with a vehicle having brakes and a tilting bed movable to lower the rearward portion thereof and to raise the forward portion thereof, a safety bumper for the rear of said vehicle, comprising:
- a. impact means for encountering obstructions when said vehicle is backing,
- b. connecting means for connecting said impact means to the rear of said tilting bed of said vehicle,
    said connecting means including plural support members each having a spring providing resilient region intermediate to upper and lower regions thereof,
    said lower region having connected thereto said impact means,
    said connecting means also including pivot means for pivotally connecting said upper regions of said support members to the rear of said vehicle,
    said pivot means including means for allowing limited pivotal movement of said upper regions forwardly relative to said vehicle and for precluding substantial rearward pivotal movement of said upper regions relative to said vehicle whereby said upper regions maintain substantially a fixed position relative to said bed when said bed is so moved,
    said support members each including a hinge means intermediate upper and lower regions thereof for allowing said lower regions to pivot rearwardly relative to said upper regions upon such movement of said bed, while substantially precluding pivoting of said lower regions forwardly relative to said upper regions beyond a predetermined point, and
- c. signal generating means for generating a signal when movement of said impact means toward said vehicle causes a predetermined pivotal movement of said support members about said pivot means,
    said resilient regions of said support members remaining substantially unflexed until said predetermined pivotal movement of said support members causes said signal to be generated, said resilient regions flexing thereafter to permit further movement of said impact sensing means toward said vehicle without further pivotal movement of said upper regions of said support members about said pivot means.

9. The combination of claim 8 wherein said signal generating means includes means for causing brakes of said vehicle to be applied when said signal is generated.

10. The combination of claim 8 wherein:
- a. said tilting bed of said vehicle has first and second outwardly opening doors at the rear thereof,
- b. said impact means includes a first impact element and a second impact element,
- c. said connecting means including plural first support members and plural second support members, said first impact element being connected to said first support members, said second impact element being connected to said second support members,
- d. said pivot means pivotally connecting said first support members to said first door and pivotally connecting said second support members to said second door, thereby permitting each of said doors to be opened independently.

11. The combination of claim 8 wherein said signal generating means includes means for causing brakes of said vehicle to be applied when said signal is generated.

12. In combination with a vehicle having a tilting bed, brakes and a reverse gear, a safety bumper for the rear of said vehicle, comprising:
- a. a bumper unit including plural spaced elongate resilient bumper elements,
- b. support means for supporting said bumper unit, said support means including a pair of depending support members,
    each said support member including an upper link, a helical spring element, a lower link and a tubular bumper mount,
        a lower end of said upper link projecting into an upper end of said spring element and being connected thereto,
        an upper end of said lower link projecting into a lower end of said spring element and being connected thereto,
        said lower end of said upper link and said upper end of said lower link being spaced apart within said spring element,
        a lower end of said lower link projecting into an upper end of said tubular bumper mount and being transversely pivotally pinned thereto, said bumper mount having an upper rearward corner thereof cut away to permit rearward pivoting of said bumper mount relative to said lower link of said support member, an upward forward corner of said bumper mount preventing forward pivoting of said bumper mount relative to said lower link beyond a position in which said bumper mount and said lower link are in substantial alignment, each bumper mount supporting an end of said bumper unit, c. pivot means for pivotally connecting said pair of support members to said vehicle, said pivot means including a pair of brackets connected to said tilting bed of said vehicle, said brackets including transverse pivot pins for pivotally connecting upper ends of said upper links of said support members, lower rear corners of said brackets preventing rearward pivoting of said upper links of said support members relative to said brackets, and d. signal generating means for generating a signal when an obstruction is encountered by said bumper unit, thereby causing said bumper unit and said bumper mounts connected thereto to move inwardly toward said vehicle, said signal generating means including first electrical switches positioned on each said bracket adjacent to and forwardly of said upper ends of said upper links, forward pivoting of said upper links about said pivot pins, relative to said brackets, causing said first switches to be actuated, said first switches thereafter limiting further forward pivotal movement of said upper links about said pivot pins relative to said brackets and said spring elements flexing thereafter to allow misalignment of said upper and lower links and to thereby permit said bumper units and said bumper mounts to continue to move inwardly toward said vehicle, whereby damage to an obstruction encountered thereby may be avoided, said spring elements otherwise maintaining said upper and lower links in substantial alignment said signal generating means further including a second electrical switch positioned for actuation when said truck is in said reverse gear and a third electrical switch positioned for actuation when said tilting bed is substantially fully lowered.

13. The combination of claim 12 wherein said signal is generated by said signal generating means when either of said first switches is actuated simultaneously with actuation of both of said second and third switches.

14. The combination of claim 13 wherein said signal generated by said signal generating means causes said brakes of said vehicle to be applied.

15. The combination of claim 12 wherein said bumper mounts include means for varying the distance between at least one of said plural bumper elements and said tilting bed.

16. In combination with a vehicle having a reverse gear, brakes and a tilting bed with vertically mounted, outwardly swinging first and second doors, a safety bumper for the rear of said vehicle, comprising:

a. bumper means for encountering obstructions, said bumper means including laterally separated first and second bumper units each including plural resilient bumper elements, b. support means for supporting said pair of bumper units, said support means including a pair of depending first support members for supporting said first bumper unit and a pair of depending second support members for supporting said second bumper unit, said first and second support members each including an upper link, a helical spring element, a lower link and a tubular bumper mount, a lower end of said upper link and an upper end of said lower link being mounted within opposite ends of said spring element and being secured thereto, said lower end of said upper link and said upper end of said lower link being spaced apart, a lower end of said lower link being mounted within an upper end of said tubular bumper mount and being pinned therein, said bumper mounts of said first support members having connected thereto end regions of said first bumper unit and bumper mounts of said second support members having connected thereto end regions of said second bumper unit, c. pivot means for pivotally connecting said first support members to said first door and said second support members to said second door, said pivot means including a first pair of brackets connected to said first door and a second pair of brackets connected to said second door, said first pair of brackets including transverse pivot pins for pivotally mounting said upper links of said first support members, said second pair of brackets including transverse pivot pins for pivotally mounting said upper links of said second support members, lower rear corners of said first pair of brackets preventing substantial rearward pivoting of said upper links of said first support members when said first door is closed, lower rear corners of said second pair of brackets preventing substantial rearward pivoting of said second support members when said second door is closed, and d. signal generating means for generating a signal when an obstacle is encountered by either of said first and second bumper units, thereby causing said bumper unit and said bumper mounts connected thereto to move inwardly toward said vehicle, said signal generating means including first electrical switches positioned on said brackets, adjacent to and forwardly of said upper ends of said upper links of said support members, forward pivoting of said upper links of said support members about said pivot pins relative to said brackets causing said first switches to be activated, said first switches thereafter limiting further forward pivotal movement of said upper links of said support members about said pivot pins relative to said brackets, and said spring elements flexing thereafter to allow misalignment of said upper and lower links and to thereby permit said bumper units and said bumper mounts to continue to move inwardly toward said vehicle, whereby damage to an obstruction encountered thereby may be avoided, said spring element otherwise maintaining said upper and lower links in substantial alignment, said signal generating means also including a second electrical switch positioned for activation when said vehicle is in said reverse gear and a third electrical switch positioned for actuation when said tilting bed is substantially fully lowered.

17. The combination of claim 16 wherein bumper mounts have upper rearward corners cut away to permit rearward pivoting of said bumper mounts relative to said lower links of said first and second support mounts, when said first and second doors are closed, and wherein, when said first and second doors are closed, upward forward corners of said bumper mounts prevent forward pivoting of said bumper mounts relative to said lower links beyond positions in which said bumper mounts and said lower links are in substantial alignment.

18. The combination of claim 16 wherein said bumper mounts include means for varying the distance between the uppermost of said plural bumper elements and said tilting bed.

19. The combination of claim 16 wherein said signal is generated by said signal generating means when any of said first switches are actuated simultaneously with the actuation of both said second and third switches.

20. The combination of claim 19 wherein said signal generated by said signal generating means causes said brakes of said vehicle to be applied.

* * * * *